(12) United States Patent
Corzilius

(10) Patent No.: US 6,598,492 B1
(45) Date of Patent: Jul. 29, 2003

(54) PNEUMATIC CAGING SYSTEM FOR GYRO-STABILIZED SENSOR PLATFORMS

(75) Inventor: Brian S. Corzilius, Cloverdale, CA (US)

(73) Assignee: Wescam Sonoma Inc., Healdsburg, CA (US)

( * ) Notice: Subject to any disclaimer, the term of this patent is extended or adjusted under 35 U.S.C. 154(b) by 0 days.

(21) Appl. No.: 09/715,537

(22) Filed: Nov. 17, 2000

Related U.S. Application Data

(60) Provisional application No. 60/166,865, filed on Nov. 22, 1999.

(51) Int. Cl.[7] .................... G01C 19/04; G01C 19/24
(52) U.S. Cl. ................................ 74/5.5; 74/5.1
(58) Field of Search ............... 74/5.1, 5.12, 5.22, 74/5.5

(56) References Cited

U.S. PATENT DOCUMENTS

| | | | | |
|---|---|---|---|---|
| 944,511 A | * | 12/1909 | Schlick et al. ............. 74/5.5 |
| 3,122,937 A | * | 3/1964 | Fillery ................. 74/5.22 X |
| 3,142,181 A | * | 7/1964 | Moller ................. 74/5.5 X |
| 3,430,499 A | * | 3/1969 | Craig ..................... 74/5.1 |
| 3,564,931 A | * | 2/1971 | Humphrey ............... 74/5.5 |
| 3,576,134 A | * | 4/1971 | Fersht .................. 74/5.22 |
| 3,861,696 A | * | 1/1975 | Gustafsson ............. 280/6 H |
| 3,939,947 A | | 2/1976 | Cohen et al. |
| 3,992,955 A | | 11/1976 | Evans et al. |
| 4,016,960 A | | 4/1977 | Wilcox |
| 4,193,308 A | | 3/1980 | Stuhler et al. |
| 4,295,381 A | * | 10/1981 | Hinds ................. 74/5.22 X |
| 4,322,984 A | | 4/1982 | Lasker et al. |
| 4,523,513 A | * | 6/1985 | Gudat et al. ............... 91/427 |
| 4,691,798 A | * | 9/1987 | Engelbach ............... 180/209 |
| 4,807,485 A | | 2/1989 | Bennett |
| 4,905,419 A | * | 3/1990 | Makarov et al. .......... 74/573 F |
| 4,989,466 A | * | 2/1991 | Goodman ............... 74/5.22 |
| 5,947,155 A | * | 9/1999 | Miki et al. ............. 335/256 X |
| 6,152,544 A | * | 11/2000 | Greaves, Jr. ............ 188/112 R |
| 6,196,514 B1 | * | 3/2001 | Kienholz ............... 248/550 |

* cited by examiner

Primary Examiner—Charles A. Marmor
Assistant Examiner—Roger Pang
(74) Attorney, Agent, or Firm—Bissell & Bissell; Henry M. Bissell; Henry M. Bissell, IV

(57) ABSTRACT

A passive caging system for use in gyro-stabilized sensor platforms and the like, employing a pneumatic dashpot in place of automatic caging gyro brakes, pin-locking devices, springs, fluid damped pistons, or air bladders. A pneumatic dashpot in combination with a normally closed solenoid valve provides effective damping of shock forces while the system is in the unpowered state. When power is applied to the system, the solenoid valve is open and unrestricted movement of the sensor platform is enabled.

6 Claims, 2 Drawing Sheets

PNEUMATIC CAGING SYSTEM FOR GYRO-STABILIZED SENSOR PLATFORMS

CROSS-REFERENCE TO RELATED APPLICATION

This application claims the benefit of U.S. Provisional Application No. 60/166,865, filed Nov. 22, 1999.

BACKGROUND OF THE INVENTION

1. Field of the Invention

This invention relates generally to gyro caging systems and, more particularly, to a passive caging system for use in gyro-stabilized sensor platforms and similar systems.

In the gyro-stabilized sensor platform field, it is essential that the system design adequately protect the delicate instruments of the sensor platform. The gyro-stabilized sensor platform must be protected from excessive shock forces. Currently, such protective measures operate only when the system is powered. In the unpowered state these protective measures are not active and are therefore unable to provide the necessary protection. The present invention provides the required degree of protection while the system is in the unpowered state, without requiring manual intervention or complex system design.

2. Description of Related Art

With gyro-stabilized sensor platforms, motors are frequently employed to actively damp gimbal, and therefore sensor platform, motion. These motors, when powered and active, may enable the gimbal unit to survive shock forces in excess of 20 times the force of gravity. An unfortunate consequence of these motor-damped gimbal systems is their inherent dependence upon power. When power to the motors is shut off, the protection offered by the motors is no longer present. As a result, it is not uncommon for gyro-stabilized gimbal and sensor platform systems to experience failures from shocks and other forces incurred during shipping, handling, and transport by the intended platform vehicle.

Various attempts have been made to prevent shock-related damage and failure of gyro-stabilized gimbal devices while in the unpowered state. A variety of pin-locking devices have been used with partial success. Such pin-locking devices, sometimes controlled by solenoids, serve to lock the inner gimbal frames to the gimbal package when the system is unpowered. These devices have the disadvantage that, through their operation and design, the majority of shock is transferred to the delicate and often expensive inner components, frequently resulting in their damage.

Attempts have been made to incorporate springs or fluid-damped pistons to resolve the problem. Unfortunately, these approaches tend to impair the sensitivity and response time of the gimbal platform. Still other attempts have employed air bladders to protect the gimbal devices. These air bladders frequently require manual intervention of a sensor platform user. They also require that the system design provide an air pump and its attendant electronics.

Fluid dashpots have been used in conjunction with gyro-stabilized platforms to preclude gyro precession angles in excess of design range. By employing linkages between the gyro rotor housing and a fluid dashpot, the disclosed assembly of U.S. Pat. No. 4,193,308 of Stuhler et al. permits unimpeded precession motion over a design range of precession angles while providing caging capabilities to prevent extreme motion states in excess of normal gyro design limits.

U.S. Pat. No. 4,016,960 of Wilcox discloses a dashpot with a guided piston which limits motion of the piston within a cylinder along a particular axis. U.S. Pat. No. 3,939,947 of Cohen, et al. discloses a dashpot for selectively directed damping of applied forces. The dashpot includes a cylinder, a piston which is sealingly slidable within the cylinder, and a piston rod which drives the piston. Various valve members which are connected into the system establish the direction of the damping force.

U.S. Pat. No. 4,322,984 of Lasker et al. discloses a gyroscope caging system having a clamping ring which encircles a portion of the gyro rotor. The clamping ring is adapted to engage an annular groove in the rotor simultaneously with engagement of a groove in a base support member for clamping the rotor during very high acceleration launches of a missile or airborne vehicle. However, it depends upon being actively powered for its operation and cannot perform its clamping function in the absence of power.

U.S. Pat. No. 3,992,955 of Evans et al. discloses a caging mechanism for a gyro in which a flat split ring mounted in a plane perpendicular to the gyro rotor spin axis is deformable to capture the gyro rotor when deformed by a gas activated piston. When the piston is operative, the rotor is either caged or uncaged depending upon the state of the deformable split ring.

U.S. Pat. No. 4,807,485 of Bennett discloses a motor driven caging system for a free gyro which cages both the inner and out gimbals thereof and locks in both the caging and uncaging positions by means of an over-center mechanism. While this system locks in both the caging and uncaging positions, it is not clear what position will be maintained when the system is not powered.

While it is generally recognized that dashpot and linkage systems may provide a damping function to restrict gyro precession beyond design limits, the complex nature of such arrangements increases both material and production costs and adds unnecessary complexity to the system. Further, such damping systems function only while the system is in its powered state. None of the cited prior art discloses the novel features of the present invention which provides gyro platform dampening in the unpowered state.

The present invention provides a passive damping system which operates in the unpowered state of gyro-stabilized platforms and similar systems. Further, the present invention becomes functionally transparent during powered operation of the system. In other words, the damping device is operative only when power to the system is off. Embodiments of the invention may have applications for both closed and open loop gyro systems, as well as in numerous other systems which utilize gimbals to position or isolate delicate instruments and electronics.

SUMMARY OF THE INVENTION

In brief, particular arrangements of the present invention involve the provision of a pneumatic caging system for gyro-stabilized sensor platforms. Such gyro-stabilized platforms are frequently employed in the stabilization of certain sensors. One arrangement in accordance with the present invention provides secure caging of an unpowered gyro-stabilized platform through use of a dashpot assembly comprising a pneumatic dashpot in combination with a normally closed solenoid valve. The solenoid is connected to system power. The associated valve is connected in the pneumatic feedback loop. When the system is in its unpowered state, the deactivated solenoid maintains the valve in the closed position. When the piston of the dashpot is confined by the air pressure maintained by the closed solenoid valve, it functions as an equal-force, bidirectional spring. In this manner, effective damping of shock forces is achieved.

When power is applied to the solenoid, the pneumatic valve is opened and unrestricted movement of the dashpot piston is permitted. Accordingly, the gyro-stabilized sensor platform which is connected to the dashpot piston is permitted full and free operation.

The incorporation of a pneumatic dashpot and normally closed solenoid valve design rather than pin-locking devices, springs, fluid-damped pistons, or air bladders, provides effective and inexpensive protection of gyro-stabilized sensor platforms.

BRIEF DESCRIPTION OF THE DRAWINGS

A better understanding of the present invention may be realized from a consideration of the following detailed description, taken in conjunction with the accompanying drawings, in which.

DESCRIPTION OF THE PREFERRED EMBODIMENTS

Figure 1:
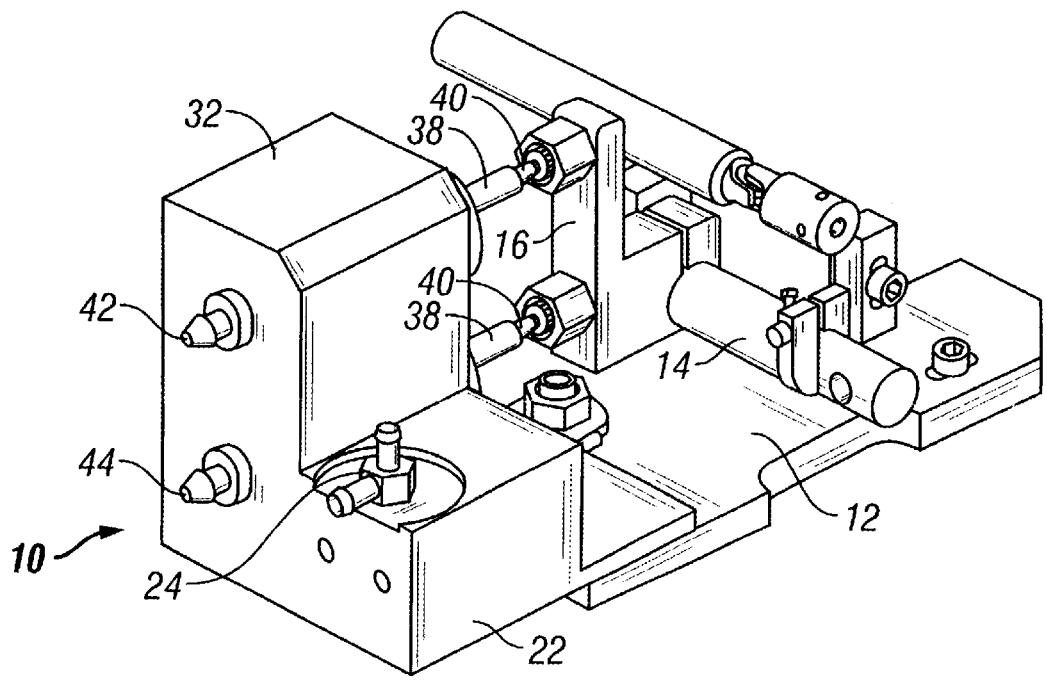
FIG. 1 is a schematic perspective view of a pneumatic caging system according to a preferred embodiment of the invention.
Figure 2:
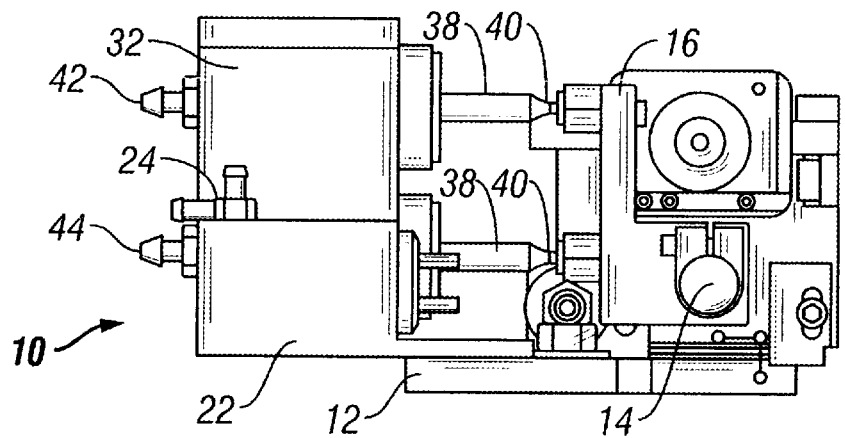
FIG. 2 is a side elevational view of the pneumatic caging system of FIG. 1.

FIGS. 1 and 2 show the portion of an overall gyro-stabilized sensor platform system which comprises a particular arrangement of the present invention. As shown in FIG. 1, the pneumatic caging system 10 of the present invention comprises a gimbal payload 12 to which are secured solenoid housing 22 and dashpot housing 32. Extending through solenoid housing 22 are air passages from solenoid ports 24. Extending through dashpot housing 32 are passages from dashpot ports 42, 44. Dashpot ports 42, 44 and solenoid ports 24 may be adapted to receive interconnecting tubing (not shown) or to vent to atmosphere. Connecting shafts 38 extend from dashpot housing 32 and terminate in attachment points 40. Gimbal axis extension 16 is secured to and extends between gimbal payload 12 and attachment points 40 of connecting shafts 38. Connecting shafts 38 may move linearly over a prescribed distance along parallel axes. Attachment point 40 of each connecting shaft 38 may be pivotably secured via gimbal axis extension 16 to inner gimbal axis 14.

The gimbal of FIGS. 1 and 2 is shown with a dual-dashpot implementation. Particular details of the dashpot stabilizing mechanism are omitted for simplification. When a gyro-stabilized gimbal platform is operated, the standard gimbal control system (open or closed loop) works to keep the gimbal platforms centered within their hard stops. The arrangements of the present invention become effective as power is shut off from such a unit in order to maintain protection of the sensitive components of the system.

Figure 3:
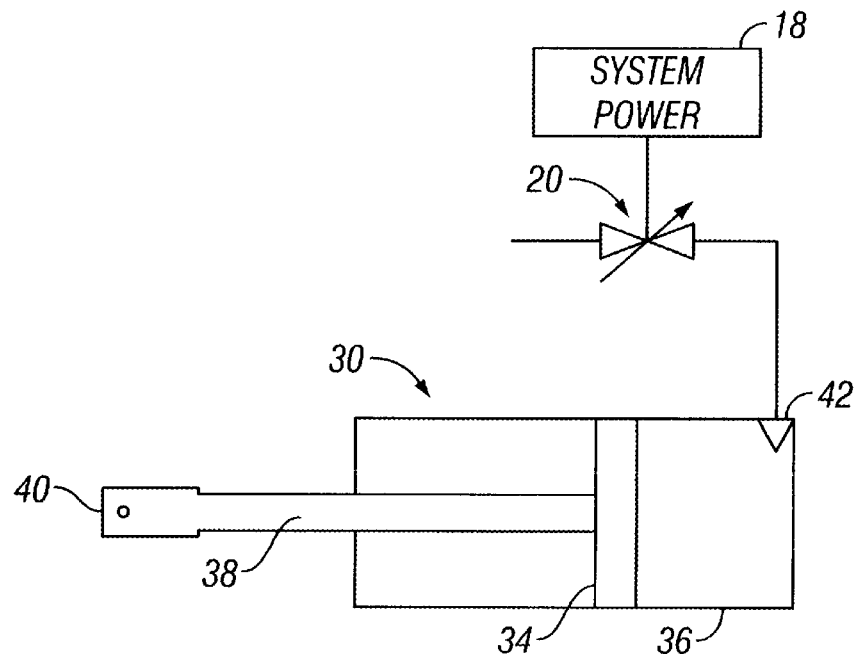
FIG. 3 is a schematic plan view of a single port dashpot assembly for inclusion in the system of FIGS. 1 and 2.

In the embodiment of the invention shown in the schematic diagram of FIG. 3, dashpot assembly 30 comprises piston 34 having connecting shaft 38 extending from one side thereof and contained within cylinder 36. Connecting shaft 38 terminates in attachment point 40 at the end of connecting shaft 38 opposite piston 34. Cylinder 36 is closed at one end, most commonly on the side of piston 34 opposite connecting shaft 38, creating a chamber having variable volume depending upon movement of piston 34 relative to cylinder 36. As piston 34 moves relative to cylinder 36 and the volume contained in cylinder 36 is varied, pneumatic exchange occurs through dashpot port 42.

Connecting shaft 38 is secured to one side of piston 34 contained by cylinder 36. The movement of piston 34 and connecting shaft 38 relative to cylinder 36 and thereby gimbal payload 12 is controllable by pneumatic exchange through dashpot port 42 which in turn is controlled by solenoid valve 20, which is electrically connected to system power 18. When solenoid valve 20 is opened, which occurs when power is applied to the unit, unrestricted pneumatic exchange may occur through solenoid valve 20. In this case, movement of piston 34 relative to cylinder 36 is similarly unrestricted.

This pneumatic exchange may be controlled by solenoid valve 20. When in the open position, solenoid valve 20 permits the unimpeded pneumatic exchange through dashpot port 42. Accordingly movement of piston 34 relative to cylinder 36 is similarly unimpeded.

When solenoid valve 20 is closed, as when the solenoid is not energized due to removal of system power 18, air flow is blocked by solenoid valve 20 and thereby the movement of piston 34 relative to cylinder 36 is restricted. In this condition, piston 34 and cylinder 36 function as a bi-directional resilient spring force. The dashpot of FIG. 3 is provided with a single port 42 which communicates via the solenoid valve 20 with atmosphere.

Figure 4:
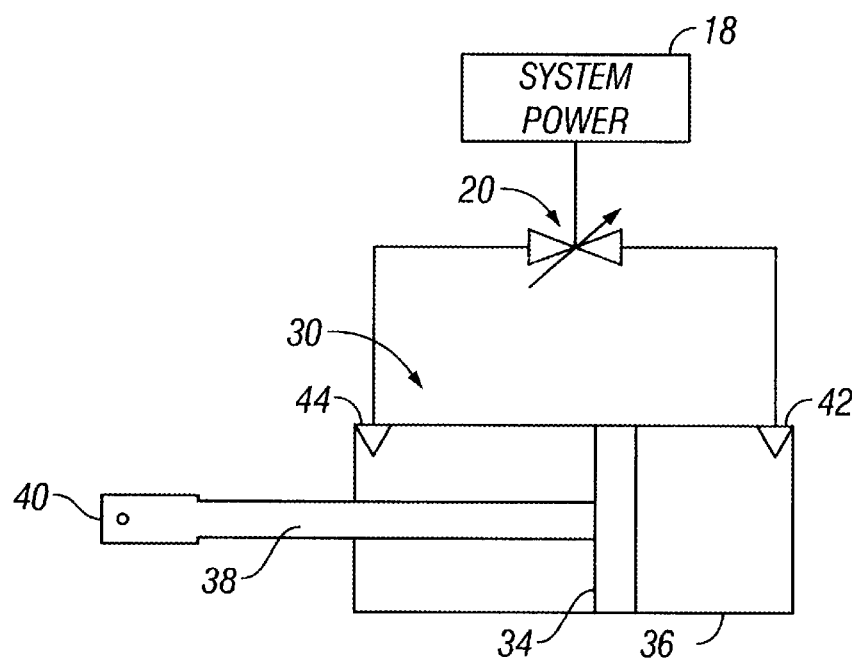
FIG. 4 is a schematic plan view of a dual port dashpot assembly for inclusion in the system of FIGS. 1 and 2.

The embodiment of the invention depicted in FIG. 4 incorporates a closed loop system. This has two ports 42 and 44 on opposite sides of the piston 34 and is appropriate for use in a corrosive environment. In this embodiment, cylinder 36' is closed at both ends on opposite sides of the piston 34. The solenoid valve 20 is connected in series between the two dashpot ports 42, 44. A second dashpot port 44 is located on the opposite side of piston 34 from dashpot port 42. Solenoid valve 20 is in series between dashpot ports 42 and 44.

When solenoid valve 20 is open, unimpeded pneumatic exchange may occur through the dashpot ports 42, 44 and thus unrestricted movement of piston 34 relative to cylinder 36' is permitted. When solenoid is not supplied with power, valve 20 is closed, pneumatic exchange is prevented and thereby piston 34 is restrained within cylinder 36'. In this case, piston 34 functions as a bi-directional, resilient spring force, as in FIG. 3.

By securing gimbal axis 14 or gimbal payload 12 to attachment point 40 of connecting shaft 38 and the other element to cylinder 36, movement of gimbal payload 12 relative to inner gimbal axis 14 may be controlled. By employing the normally closed solenoid valve 20, pneumatic flow through solenoid valve 20 is prevented when the solenoid is without power, and thus movement of piston 34 relative to cylinder 36 is restricted. By restricting piston 34 within cylinder 36, through the closure of solenoid valve 20, shock forces applied to one of either gimbal payload 12 or inner gimbal axis 14 may be significantly damped.

When power is applied to normally closed solenoid valve 20, the valve is opened and pneumatic exchange may occur. With solenoid valve 20 opened, piston 34 is free to move relative to cylinder 36. Thus, gimbal payload 12 may move independently and unrestricted by movement of inner gimbal axis 14.

Although there have been described hereinabove various specific arrangements of a PNEUMATIC CAGING SYSTEM FOR GYRO-STABILIZED SENSOR PLATFORMS in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A dashpot assembly for caging a gyro-stabilized sensor platform comprising:

a pneumatic piston and cylinder combination, the cylinder having first and second ends defining chambers on opposite sides of said piston;

a solenoid and valve combination connected to system power for activation of the solenoid and coupled to said first chamber via a port in the first end of said cylinder to block the flow of gas through said port when system power is off;

a link extending from said piston to a coupling with said gyro-stabilized sensor platform for caging said platform when travel of the piston is limited by the pressure of gas in said first chamber resulting from the blocking of gas flow by said solenoid and valve combination;

wherein said valve is open to the flow of gas to and from said first chamber when the associated solenoid is energized and wherein said valve is closed when the solenoid is not energized.

2. A dashpot assembly for caging a gyro-stabilized sensor platform comprising:

a pneumatic piston and cylinder combination, the cylinder having first and second ends defining chambers on opposite sides of said piston;

an electromagnetic solenoid;

means connecting the solenoid to system power for actuation thereof;

a valve associated with and controlled by said solenoid between an open position when the solenoid is activated and a closed position when system power is off;

a link coupled between the piston of said pneumatic piston and cylinder combination and the gyro-stabilized sensor platform for limiting movement of said platform in accordance with the limited travel of said piston resulting from the blocked flow of gas through said valve when the solenoid is not activated; and means coupling the valve in series with a gas passage port in the first end of said cylinder in order to damp shock forces experienced by the gyro-stabilized sensor platform by gas trapped in said first chamber upon closure of the valve when system power is removed.

3. The assembly of claim 2 wherein the second end of said cylinder and the side of the valve remote from said port are open to atmosphere.

4. The assembly of claim 2 wherein the second end of said cylinder is closed and defines a confined chamber therein, and further including a second gas passage port in the second end of said cylinder, and means connecting said valve between said first and second ports for protection of said piston and cylinder combination in a corrosive atmosphere.

5. The assembly of claim 2 wherein said solenoid and valve combination comprises a normally closed valve.

6. A dashpot assembly for caging a gyro-stabilized sensor platform comprising:

a pneumatic piston and cylinder combination, the cylinder having first and second ends defining chambers on opposite sides of said piston;

an electromagnetic solenoid;

means connecting the solenoid to system power for actuation thereof;

a valve associated with and controlled by said solenoid between an open position when the solenoid is activated and a closed position when system power is off; and means coupling the valve in series with a gas passage port in the first end of said cylinder in order to damp shock forces experienced by the gyro-stabilized sensor platform by gas trapped in said first chamber upon closure of the valve when system power is removed, further including a gyro-stabilized sensor platform and means coupling the assembly to the platform for caging the platform upon loss of system power.

* * * * *